United States Patent Office 3,850,924
Patented Nov. 26, 1974

3,850,924
PROCESS FOR PREPARING HERBICIDAL TRIAZINES
Julius Jakob Fuchs and Joel Benjamin Wommack, Jr., Wilmington, Del., assignors to E. I. du Pont de Nemours and Company, Wilmington, Del.
No Drawing. Filed Apr. 5, 1973, Ser. No. 348,324
Int. Cl. C07d 55/18
U.S. Cl. 260—249.5      5 Claims

ABSTRACT OF THE DISCLOSURE

3 - Cyclohexyl - 1 - methyl - 6 - dimethylamino - s - triazine-2,4(1H,3H)-dione is prepared by the following reaction sequence:

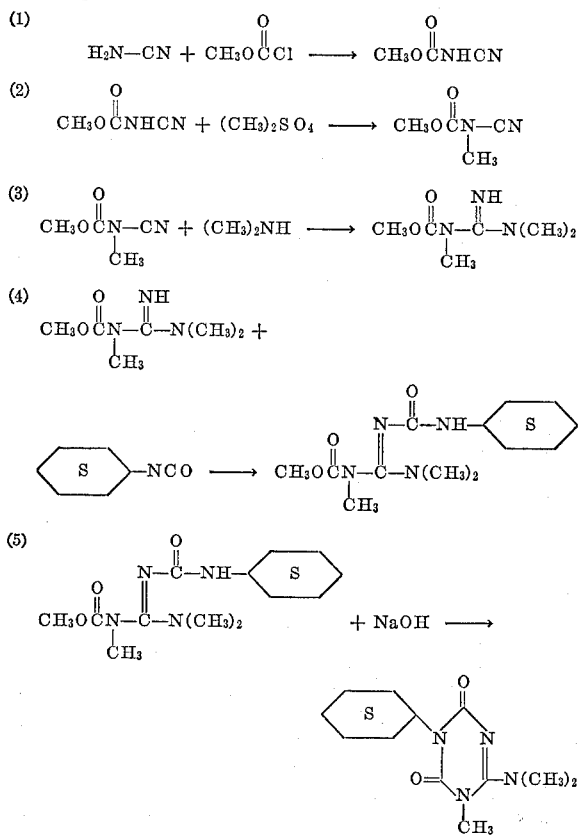

Related 3-substituted-1-methyl-6-(substituted)amino-s-triazine-2,4(1H,3H)diones and -4-thio-2,4(1H,3H)-diones are prepared similarly. The products are useful as herbicides.

CROSS REFERENCE TO RELATED APPLICATION

U.S. Application of K. Lin, Ser. No. 348,321, filed simultaneously herewith as a continuation-in-part of Ser. No. 256,249, filed May 24, 1972, now abandoned, discloses 3 - substituted - 1 - methyl - 6 - (substituted)amino-s-triazine - 2,4(1H,3H) - diones and 4-thio(1H,3H)2,4-diones, their use as herbicides and two methods for their preparation. One is the method of this invention. The other involves reaction of an amine with a 3-substituted-1-methyl-6-alkylthio-s-triazine-2,4(1H,3H)-dione or 4-thio-(1H,3H)-2,4-dione. Parent application Serial No. 256,249 discloses the second method, but does not disclose the method of this invention.

PRIOR ART

The starting material for this process is methyl cyanocarbamate, alternatively named methoxycarbonylcyanamide. Preparation of this compound from cyanamide and methyl chloroformate is described in U.S. Pat. 3,657,443.

The first step of this process involves reacting methoxycarbonylcyanamide with dimethyl sulfate to produce N-methoxycarbonyl-N-methylcyanamide. An analogous reaction between ethoxycarbonylcyanamide and dimethyl sulfate is described in Berichte, 62, 1393–1394 (1929).

SUMMARY OF THE INVENTION

This invention is a process for preparation of compounds of the formula:

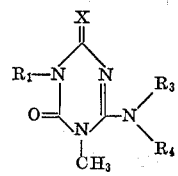

which comprises the following steps in sequence:

A: reacting an alkylating agent of the formula $CH_3Z$ with methoxycarbonylcyanamide to form N-methoxycarbonyl-N-methylcyanamide;
B: reacting the product of step A with an amine of the formula $R_3R_4NH$ to form a compound of the formula:

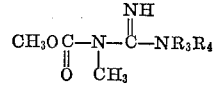

(7)

C: reacting the product of step B with an isocyanate or isothiocyanate of the formula $R_1NCX$ to form a compound of the formula:

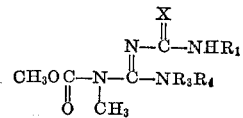

D: treating the product of step C with a base M'OR to cyclize and form the desired product;

wherein, in the above formulae:

$R_1$ is $C_2$–$C_8$ alkyl, $C_5$–$C_8$ cycloalkyl, norbornyl, methylcyclohexyl, methylcyclopentyl, phenyl, or chlorophenyl;
$R_3$ is hydrogen or methyl;
$R_4$ is $C_1$–$C_4$ alkyl;
X is oxygen or sulfur; provided that when
 X is sulfur, $R_3$ is methyl;
 Z is iodide or —O—$SO_2$—$OCH_3$;
 M' is alkali metal; and
 R is hydrogen or $C_1$–$C_4$ alkyl.

DESCRIPTION OF THE INVENTION

The process of this invention comprises the reactions of equations (2) through (5) below. Equation (1) represents preparation of the starting material (3) as described in U.S. Pat. 3,657,443.

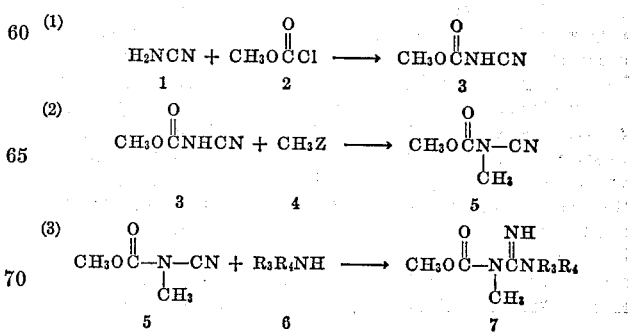

(4) 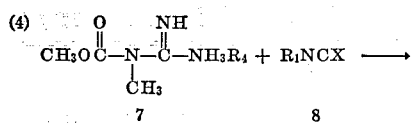 + R₁NCX ⟶

7        8

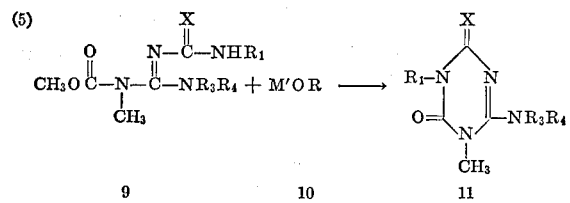

9

(5) 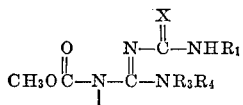 + M'OR ⟶ 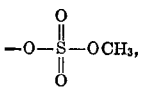

9       10       11 wherein: $R_1$ is selected from alkyl of 2 through 8 carbon atoms, cycloalkyl of 5 through 8 carbon atoms, norbornyl, methylcyclopentyl, methylcyclohexyl, phenyl and chlorophenyl; $R_3$ is hydrogen or methyl; $R_4$ is alkyl of 1 through 4 carbon atoms; and X is oxygen or sulfur; provided that when X is sulfur, $R_3$ is methyl; Z is iodide or $$-O-\underset{\underset{O}{\|}}{\overset{\overset{O}{\|}}{S}}-OCH_3,$$

M' is alkali metal; and R is hydrogen or alkyl of 1 through 4 carbon atoms.

An aqueous solution of the sodium salt of compound 3, containing from 15 to 35% of 3, preferably 20 to 30%, is reacted at 10 to 70° C., preferably 25 to 45° C., with 0.9 to 1.4, preferably 1.0 to 1.2, molecular equivalents of an alkylating agent 4 (for example, dimethyl sulfate) during a period of 2 to 16 hours, preferably 4 to 8 hours (Equation 2). As the reaction proceeds a second phase of compound 5 forms. After the reaction has proceeded for the desired time the upper layer of compound 5, which contains some water, is separated and the lower aqueous layer is extracted with an organic solvent selected from methylene chloride, dichloroethane, triclene, benzene, toluene, and xylene; toluene is preferred. Methyl iodide can be used instead of dimethyl sulfate; the sulfate is preferred for economic reasons.

The extract and the upper layer are analyzed for compound 5 by gas chromatography and added to an aqueous solution containing 15 to 75%, preferably 25 to 50% of the hydrochloride or sulfate of compound 6, preferably the sulfate (Equation 3). The mole ratio of amine salt to compound 5 can be from 1 to 3, preferably 1.5 to 2.5. The extraction solvent used (e.g. toluene) is removed by either azeotropic or simple distillation, depending on the boiling point. The residual aqueous mixture is then agitated for from 3 to 10 hours at 50 to 110° C., preferably 85 to 95° C. (Equation 3). Higher temperatures require shorter reaction times and vice versa.

The resulting reaction mass contains compound 7 and by-product trisubstituted guanidine as well as unreacted compound 6, all present as salts. Before proceeding with the reaction of compound 7 with compound 8 it is necessary to liberate the free bases and remove the excess compound 6 to prevent the formation of by-product ureas. This operation can be effected by adding 50% aqueous sodium hydroxide equivalent to the amount of compounds 6 and 7 present, as determined by gas chromatographic analyses, and extracting with an organic solvent such as methylene chloride, followed by distilling a portion of the organic solvent to remove excess compound 6, or by removing compound 6 directly from the aqueous solution by distillation after first adding base to form the free amine. The latter procedure is preferred. Compound 7 is relatively unstable in aqueous solution when present as the free base and tends to decompose into the corresponding trisubstituted guanidine. The rate of decomposition is directly proportional to pH and temperature. Therefore, when removing excess compound 6 by direct distillation from water it is advantageous to use a vacuum or inert gas and to perform the operation as rapidly as possible.

The above described aqueous distillation procedure can be operated batchwise or continuously. It is preferred to carry out the operation in a continuous manner so that the exposure of compound 1 to high temperature and high pH is reduced to a minimum. This is accomplished by adding aqueous alkali metal hydroxide to the product from reaction 3 in a pipe-line reactor or by running the product and the alkali metal hydroxide into a small agitation vessel with a short holdup time, no more than 10, preferably no more than 2 minutes. If the concentration of amine salt used is such that sodium salt precipitates during this neutralization additional water must be added to maintain this salt in solution. The overflow from this vessel is fed to a distillation column operated under vacuum. The column is heated by feeding steam into the bottom; compound 6 and water are taken off as distillate (overhead) and an aqueous solution of compound 7 and trisubstituted guanidine as bottoms.

The conditions under which the column can be operated are numerous and depend to some extent on the substituents present in compound 6. However, in general, conditions are selected so that the temperature of the feed to the column is not over 50° C. This necessitates cooling the product from equation 3 to approximately 30° C. before adding the caustic. The column is operated at a pressure of 25 to 300 mm. of Hg preferably 50 to 150 mm. and the amount of steam fed to the bottom of the column is adjusted such that the amount of water taken overhead along the compound 6 is equivalent to 5 to 25% of the weight of the reaction mass from equation 3.

The bottoms from the above distillation are fed into a hold tank which is maintained at a pH of 5 to 7 by the continuous addition of either sulfuric or hydrochloric acid; sulfuric is preferred. The concentration of compound 7 in the neutralized solution is maintained at 15 to 50%, preferably 20 to 40%. The concentration will depend upon the strength of the salt solution of compound 6, base and acid solutions employed in the previous steps, and the amount of concentration or dilution which occurred during the distillation. The temperature of this solution is maintained at 25 to 45° C., preferably 25 to 35° C., by either cooling the bottoms in a continuous-type cooler before neutralization or by cooling the neutralization vessel itself.

Reaction 5 is performed by preparing a mixture of the above solution and a solvent such as benzene, chlorobenzene, toluene or xylene; toluene is preferred. The amount of solvent added should be sufficient to dissolve the amount of compound 9 which will be formed. Generally the amount of solvent used is about 7 to 10 times the amount of compound 9 present in the aqueous solution.

An amount of compound 8 which is stoichiometrically equivalent to 85 to 100%, preferably 92 to 98%, of the compound 7 present in the aqueous layer is now added and with good agitation the addition of 50% aqueous caustic is started while the temperature is maintained at −5 to 50° C., preferably 5 to 35° C. by external cooling. The caustic addition is made as rapidly as heat can be removed to maintain the desired temperature and is continued until an amount stoichiometrically equivalent to the amount of acid used in neutralizing compound 7 has been added. If a second phase of a sodium salt is now present, sufficient water should be added to dissolve it. The reaction is allowed to continue after the caustic addition is complete until the pH of the aqueous solution is nearly constant. This requires an addition time of 1 to 3 hours. Alternatively, compound 8 and the aqueous caustic can be added simultaneously while the pH of the reaction mass is maintained at 9 to 10, preferably 9.3 to 9.7, during 1 to 4 hours, preferably 2 to 3. The aqueous sodium hydroxide addition is then continued until the pH is essentially constant. The agitation is stopped and the layers allowed to separate. The lower aqueous layer is removed and the upper organic layer is evaporated at a pressure of 50 to 760 mm./Hg, preferably 100 to 300 mm./Hg, until a clear distillate is obtained (indicating that all water has been removed).

The residual solution or slurry containing compound 9 is cooled, if necessary to 25°–45° C., while anhydrous amine 6 (for example, dimethylamine) is added, either as a gas, or a liquid. It is preferred to add the amine 6 at 25–35° C., but higher or lower temperatures can be used depending on the solubility of amine 6 in the particular solvent. It is important to have at least 1.0 and, preferably, 1.0 to 2.5 moles of amine 6.

Next the ring closure catalyst (compound 10) is added (Equation 5). The catalyst is an alkali metal alkoxide and it may be added either as a dry solid or as a solution in the alkanol. Dry sodium methoxide or a solution of sodium methoxide is methanol is a preferred catalyst. The amount of catalyst needed is from 0.1 to 5.0 mole percent of compound 9. Higher concentrations are not desirable because side reactions begin to intervene. A preferred concentration of compound 10 is from 1.0 to 2.0 mole percent of compound 9. The temperature is not critical and the ring-closure reaction can proceed at temperatures from 0° C. to 120° C. provided that amine 6 is kept within the reaction system. The reaction is normally exothermic and the solution may be cooled if a lower temperature is required to retain amine 6. It is critical that the amine 6 remain present until ring closure is about complete.

After the catalyst is added, the reaction mass is held for 0.1 to 2.0 hours to insure completion of the ring closure. The reaction is rapid and normally is about complete in less than 1 hour.

The amine 6, by-product methanol, and part of the solvent are then removed by distillation, either at atmospheric or reduced pressure. Water is then added and the remainder of the solvent is removed by azeotropic distillation. The overhead water may be discarded or returned to the system, whichever is desirable. The amount of water remaining in the residue is not critical and may range from 0.1 to 5 or more parts per part of compound 11, depending on how compound 11 is to be isolated. Isolation can be by crystallization followed by filtration or centrifugation, by spray-drying, by phase-separation to remove most of the water, or by other conventional methods.

Alternatively, compound 11 can be recovered without distillation of all the methanol, amine 6 and solvent. If a poor solvent for compound 11, such as hexane, is added to the reaction mixture, compound 11 will precipitate and can be recovered by conventional methods.

The following examples further illustrate the process of this invention.

In the examples all parts are by weight and all temperatures in degrees centigrade unless otherwise indicated. Refractive indices recorded as $n_D^{25}$ are values at 25° C.

EXAMPLE 1

A. Synthesis of N-methoxycarbonyl-N-methylcyanamide (Equations 1 and 2)

To a solution of 504 parts of a 50% aqueous cyanamide solution in 825 parts of water at 25° are added during a period of 90 minutes and at a pH of 6.9–7.1 simultaneously 572 parts of methyl chloroformate and 945 parts of a 50% aqueous sodium hydroxide solution. As the addition of the reactants progresses, the temperature of the reaction is allowed to rise to 53–55° and is maintained within that range by cooling. When the addition is complete, the reaction mass is cooled to 25°, whereupon crystallization of the sodium salt of methoxycarbonylcyanamide occurs. Dimethyl sulfate (775 parts) is then added, and agitation of the reaction mass is continued while maintaining the pH at 7–7.1 by a dropwise addition of about 25 parts of a 50% aqueous sodium hydroxide solution. After 6.5 hours, the resulting two-phase solution is repeatedly extracted with methylene chloride and the extract is dried. One half of the methylene chloride extract is then evaporated under vacuum, and the residue is distilled at 50°/0.5 mm. There is obtained 237.6 parts of N-methoxycarbonyl-N-methylcyanamide (69.5% yield).

B. Synthesis of N-methoxycarbonyl-N,N',N'-trimethylguanidine (Equation 3)

A solution of 339 parts of dimethylamine hydrochloride in 500 parts of water is heated to 50°, and the remaining one half of the above methylene chloride extract is added to it gradually, while at the same time removing the methylene chloride by distillation. The resulting two-phase mixture is then heated for approximately 20 hours at 80° after which time the starting N-methoxycarbonyl-N-methylcyanamide has nearly completely disappeared. The solution is then cooled to 0°, and 336 parts of a 50% aqueous sodium hydroxide solution is added. Repeated extraction of the reaction solution with methylene chloride and evaporation of the methylene chloride under vacuum gives 228.6 parts of crude N-methoxycarbonyl-N,N',N'-trimethylguanidine of 84.4% purity, from which the pure product is isolated by distillation at 72°/0.5 mm.

By the above procedure using equivalent molecular weight amounts of the appropriate amines or appropriate N-methoxycarbonyl-N'-alkylcyanamides the following intermidate guanidines can be prepared.

TABLE I

N-methoxycarbonyl-N-methyl-N'-ethyl-N'-methyl-guanidine

N-methoxycarbonyl-N-methyl-N'-isopropyl-N'-methyl-guanidine

N-methoxycarbonyl-N-methyl-N'-butyl-N'-methyl-guanidine

C. Synthesis of methyl N-(N-cyclohexylcarbamoyl-N',N'-dimethylamidino) - N - methylcarbamate (Equation 4)

To 14.8 parts of the above crude N-methoxycarbonyl-N,N',N'-trimethylguanidine in 50 parts of methylene chloride is added 11.0 parts of cyclohexyl isocyanate. The solution temperature reaches the boiling point, and when the temperature has fallen to 25°, the solvent is evaporated under vacuum to give an oil, which crystallizes when triturated with ether. Recrystallization from a mixture of carbon tetrachloride and petroleum ether gives pure methyl (N-(N-cyclohexylcarbamoyl) - N',N' - dimethylamidino)-N-methylcarbamate, m.p. 93–94°.

TABLE II

Following the general method of Example 1C, using the appropriate isocyanate or isothiocyanate as reactants with the appropriately substituted methoxycarbonylguanidine, the following compounds can be prepared.

Methyl N-(N-cyclopentylcarbamoyl-N',N'-dimethylamidino)-N-methylcarbamate

Methyl N-[N-(2-methylcyclohexylcarbamoyl)-N',N'-dimethylamidino]-N-methylcarbamate Methyl N-[N-(3-methylcyclohexylcarbamoyl)-N',N'-dimethylamidino]-N-methylcarbamate Methyl N-(N-cyclohexylcarbamoyl-N'-butyl-N-methylamidino)-N-methylcarbamate Methyl N-(N-cyclopentylthiocarbamoyl-N',N'-dimethylamidino)-N-methylcarbamate Methyl N-(N-cyclohexylthiocarbamoyl-N',N'-dimethylamidino)-N-methylcarbamate, m.p. 122–123°

Methyl N-[N-(*sec*-butylthiocarbamoyl)-N',N'-dimethylamidino]-N-methylcarbamate

Methyl N-(N-neopentylthiocarbamoyl-N',N'-dimethylamidino)-N-methylcarbamate

Methyl N-(N-norbornylthiocarbamoyl-N',N'-dimethylamidino)-N-methylcarbamate

D. Synthesis of 1-methyl-3-cyclohexy-6-dimethylamino-*s*-triazine-2,4(1H,3H)-dione (Equations 2, 3, 4, 5)

A 10% stoichiometric excess of dimethyl sulfate (906 parts) is added at 25° with agitation to 3050 parts of an aqueous solution containing 797 parts of the sodium salt of compound 3 which has been adjusted to pH 7 with 50% aqueous sodium hydroxide. The reaction is allowed to continue for 6 hours while the temperature is maintained at 25° by external cooling and at pH 7 by the addition of 50% aqueous sodium hydroxide as required. During the reaction a separate phase of compound 5 is formed.

When the reaction is about complete the agitation is stopped and the layers allowed to separate. The upper layer of compound 5 is removed and the lower aqueous layer extracted with 2000 parts of toluene. The upper layer and the extract are added to 3300 parts of an agitated solution containing 920 parts of dimethylammonium sulfate in a vessel equipped for solvent removal. The resulting mixture is heated to 90° and vacuum applied to remove the toluene by azeotropic distillation. The distillation requires one hour and the reaction is continued for an additional 5 hours at 90°. The reaction mass is then cooled to 30°.

The above solution (3440 parts) is analyzed for dimethylamine and compound 5 by gas chromatography and found to contain 264 parts of dimethylamine and 625 parts of compound 7, ($R_3=R_4=CH_3$). The solution is then fed into an agitated vessel along with 50% aqueous sodium hydroxide at a rate of 28.6 parts of solution and 6.04 parts of 50% aqueous sodium hydroxide per minute (this amount of sodium hydroxide frees compounds 6 and 7 from their salts). The residence time in this vessel is two minutes. The effluent from this vessel is fed into the top of a packed column operated at 100 mm./Hg absolute pressure with total take-off. Atmospheric-pressure steam is fed into the bottom of the column at a rate such that the volume of $H_2O$ distilled over is 5 parts/minute. The stripped solution that exits the bottom of the column (into a vessel containing 800 parts of water) is continuously neutralized to pH 6.5 with concentrated sulfuric acid and cooled to 30° by external cooling.

When the distillation is complete the vacuum is broken and 4700 parts of toluene and 470 parts of cyclohexyl isocyanate (approximately 90% of the theoretical amount) are added to the neutralized still bottoms and 50% aqueous sodium hydroxide equivalent to the amount of sulfuric acid used in neutralizing the still bottoms is added during one-half hour while the temperature is maintained at 30° by external cooling.

The reaction is allowed to continue for an additional 3 hours until the pH becomes nearly constant at 8.8. The temperature is adjusted to 34° and maintained for 10 minutes after which time the agitator is turned off and the layers allowed to separate. The lower aqueous layer is removed and the toluene layer is distilled at 100 m. of Hg until a clear distillate is obtained.

Dimethylamine (375 parts) is sparged into the residue while the temperature is maintained at 25° by external cooling. Then 15.9 parts of a 25% solution of sodium methoxide in methanol is added with good agitation. The reaction is slightly exothermic and the temperature increases during 15 minutes to 35°. The reaction is allowed to continue for an additional one-half hour. The solution is then concentrated at 100 mm. of Hg until 4000 parts of toluene have been removed. Water (1900 parts) is added and distillation is continued until toluene removal is complete. Water taken overhead is returned to the still pot *via* a water separator.

The residue is cooled to 15° and stirred until precipitation of the product is complete. The solids are collected by filtration and dried to give 745 parts (45.3% based on compound 3) of compound 11 ($R_1$=cyclohexyl; $R_3=R_4$=methyl), m.p. 97–100.5°. The aqueous filtrate can be recycled to lessen loss of product 11.

An alternate isolation of compound 11 from the aqueous solution is as follows: The aqueous residue from the distillation is heated to 60°. This results in the formation of a two-phase system. The lower organic layer is separated from the upper aqueous layer. The organic phase amounts to 1070 parts and contains 762 parts of compound 11. The water phase contains 77 parts of compound 11 and can be recycled back to the still pot to obtain higher overall recoveries.

The following *s*-triazinediones are prepared by cyclization of the appropriate methyl N-(N-substituted carbamoyl or thiocarbamoyl-N',N'-dialkylamidino)-N-methylcarbamate by the above procedure.

Table III

1-Methyl-3-cyclopentyl-6-dimethylamino-*s*-triazine-2,4(1H,3H)-dione, m.p. 126–129°

1-Methyl-3-cyclohexyl-6-(N-butyl-N-methylamino)-*s*-triazine-2,4(1H,3H)-dione

1-Methyl-3-cyclohexyl-6-dimethylamino-*s*-triazine-4-thio-2,4(1H,3H)-dione, m.p. 210–212°

1-Methyl-3-(*sec*-butyl)-6-dimethylamino-*s*-triazine-4-thio-2,4(1H,3H)-dione

1-Methyl-3-neopentyl-6-dimethylamino-*s*-triazine-4-thio-2,4(1H,3H)-dione

1-Methyl-3-(2-norbornyl)-6-dimethylamino-*s*-triazine-4-thio-2,4(1H,3H)-dione

E. Alternate Synthesis of Methyl N-(N-cyclohexylcarbamoyl-N',N'-dimethylamidino) - N - methylcarbamate (Equation 4)

A solution of the sulfate salt of 7 as prepared in Example 1D is mixed with 4700 parts of toluene, and 470 parts of cyclohexyl isocyanate is added during 2 hours while the pH is maintained at 9.5 by the continuous addition of 50% aqueous sodium hydroxide. The sodium hydroxide addition is continued for an additional 3 hours until the pH becomes about constant at 9.5. The temperature is maintained at 30° throughout the reaction. The reaction mixture is worked up as in Example 1D to give methyl N-(N - cyclohexylcarbamoyl-N',N'-dimethylamidino)-N-methylcarbamate in about the same yield.

In the preparation of those compounds where X is sulfur, the methoxycarbonylguanidine derivative (7) reacts with an isothiocyanate (8; X=S) in inert solvent (such as tetrahydrofuran) at about room temperature to 100° C. for about 1 to 12 hours to form a methoxycarbonylallophanimidate (9; X=S). This intermediate can be isolated by evaporation of the solvent and further purified, if desired, by recrystallization; or the intermediate can be used directly, without isolation, in the next step. The methoxycarbonylallophanimidate (9; X=S) in an inert solvent (such as toluene) is treated with an alkali metal alkoxide or hydroxide (such as the methoxide or hydroxide of sodium or potassium) and the mixture heated to effect cyclization to the corresponding triazine - 4 - thione (11; X=S). The latter can be isolated by cooling the reaction mixture and filtering off the precipitate. If desired, the product can be further purified by recrystallization from an inert solvent (such as ethyl acetate).

EXAMPLE 2

Synthesis of 1-Methyl-3-cyclohexyl-6-dimethylamino-*s*-triazine-4-thio-2,4(1H,3H)-dione A mixture of 100 parts of N-methoxycarbonyl-N,N',N'-trimethylguanidine, as prepared in 1B, 89 parts of cyclohexyl isothiocyanate and 0.5 parts of dibutyltin dilaurate is heated for 8 hours at 70° in 1000 parts of toluene. The clear, yellow solution is then heated to reflux and 50 parts of toluene is distilled out. A 12.5-part aliquot of 0.5M sodium methoxide in methanol solution is added over a 30-minute period, allowing toluene to distil out of the reaction mixture. After the addition is complete, additional toluene is distilled out until 500 parts of toluene have been removed. The reaction mixture is cooled and the resulting pale yellow product, 1-methyl-3-cyclohexyl-6-dimethylamino-s-triazine-4-thio-2,4(1H,3H)-dione, crystallizes. Filtration and drying affords 113 parts of product, m.p. 210–212°.

The intermediate methyl N-(N'-cyclohexylthiocarbamyl-N,N-dimethylamidino) - N - methylcarbamate can be isolated by removing the toluene at reduced pressure and crystallizing the crude solid from ethyl acetate giving the purified intermediate, m.p. 122–123°.

In some cases it is not necessary to add the base (sodium methoxide) to effect cyclization, for example to the first two triazine-4-thiones listed below.

Similarly the following compounds can be prepared using the appropriate reagents.

TABLE IV

1-Methyl-3-ethyl-6-dimethylamino-s-triazine-4-thio-2,4(1H,3H)-dione, m.p. 139–140°

1-Methyl-3-(n-butyl)-6-dimethylamino-s-triazine-4-thio-2,4(1H,3H)-dione, m.p. 124–126°

1-Methyl-3-phenyl-6-dimethylamino-s-triazine-4-thio-2,4(1H,3H)-dione, m.p. 209–211°

1-Methyl-3-(2-methylcyclohexyl)-6-dimethylamino-s-triazine-4-thio-2,4(1H,3H)-dione 1-Methyl-3-(3-methylcyclohexyl)-6-dimethylamino-s-triazine-4-thio-2,4(1H,3H)-dione 1-Methyl-3-cyclohexyl-6-(N-methyl-N-butyl)-s-triazine-4-thio-2,4(1H,3H)-dione

What is claimed is:

1. A process for preparation of compounds of the formula:

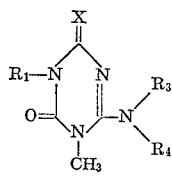

which comprises the following steps in sequence:
A: reacting a methylating agent of the formula $CH_3Z$ with methoxycarbonylcyanamide to form N-methoxycarbonyl-N-methylcyanamide;
B: reacting the product of step A with an amine of the formula $R_3R_4NH$ to form a compound of the formula:

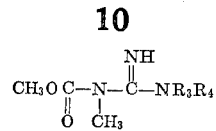

C: reacting the product of step B with an isocyanate or isothiocyanate of the formula $R_1NCX$ to form a compound of the formula:

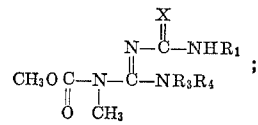

D: treating the product of step C with a base M'OR to cyclize and form the desired product;
wherein, in the above formulae:
$R_1$ is $C_2$-$C_8$ alkyl, $C_5$-$C_8$ cycloalkyl, norbornyl, methylcyclohexyl, methylcyclopentyl, phenyl, or chlorophenyl;
$R_3$ is hydrogen or methyl;
$R_4$ is $C_1$-$C_4$ alkyl;
X is oxygen or sulfur; provided that when X is sulfur, $R_3$ is methyl;
Z is iodide or $-O-SO_2-OCH_3$;
M' is alkali metal; and
R is hydrogen or $C_1$-$C_4$ alkyl.

2. Process of Claim 1 wherein step B is carried out in aqueous solution using a hydrochloride or sulfate salt of the amine $R_3R_4NH$, whereby a solution of the corresponding salt of the product is formed.

3. Process of Claim 2 wherein, between steps B and C, the reaction medium is treated with alkali to liberate the free bases of the unreacted $R_3R_4NH$ and the product, the resulting solution is immediately subjected to distillation at a temperature below 50° C. to remove $R_3R_4NH$ and the residual solution is immediately treated with sulfuric or hydrochloric acid to again form the corresponding salt of the product.

4. Process of Claim 3 wherein step D is carried out in a solvent selected from benzene, chlorobenzene, toluene and xylene in the presence of 1 to 2.5 moles of anhydrous $R_3R_4NH$.

5. Process of Claim 4 wherein $R_1$ is cyclohexyl, X is oxygen, and $R_3$ and $R_4$ are both methyl.

References Cited
UNITED STATES PATENTS 3,585,197   6/1971   Seidel et al. _____ 260—249.5

JOHN M. FORD, Primary Examiner

U.S. Cl. X.R.

71—93; 260—465.5 R, 561 R